UNITED STATES PATENT OFFICE.

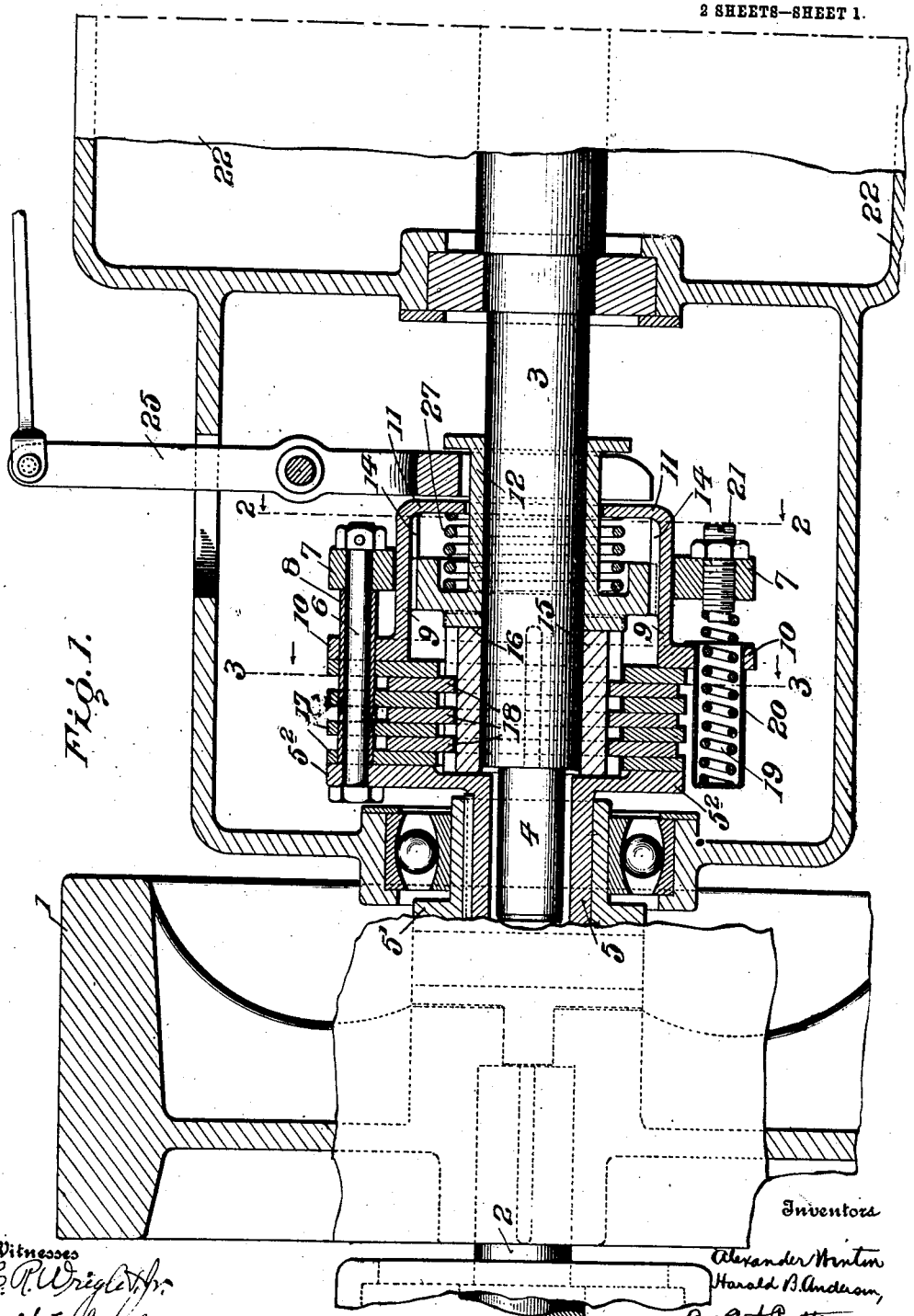

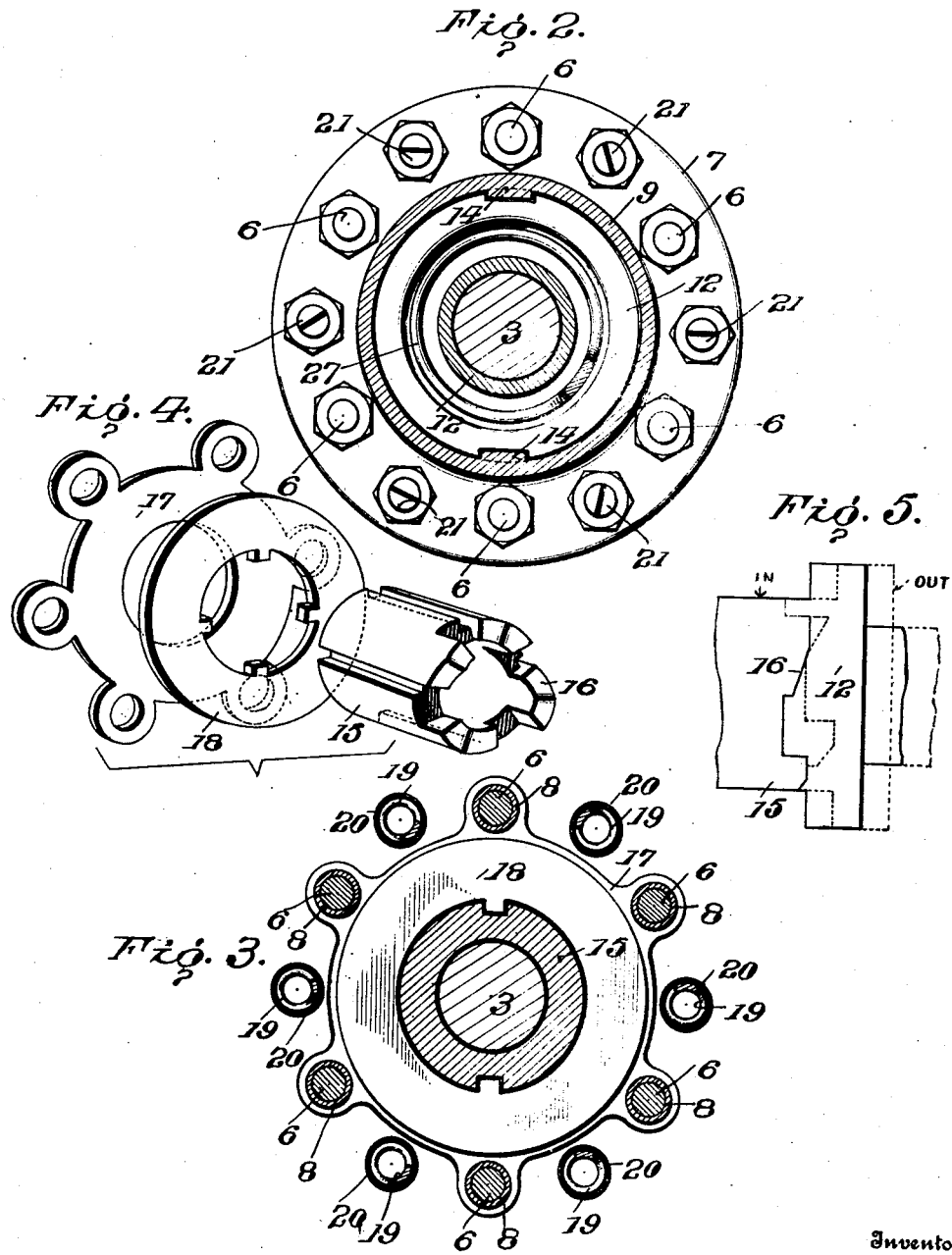

ALEXANDER WINTON AND HAROLD B. ANDERSON, OF CLEVELAND, OHIO, ASSIGNORS TO THE WINTON MOTOR CARRIAGE CO., OF CLEVELAND, OHIO.

CLUTCH.

No. 835,721.  Specification of Letters Patent.  Patented Nov. 13, 1906.

Application filed May 4, 1906. Serial No. 315,238.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Clutches, of which the following is a specification, reference being had therein to the accompanying drawings.

This invention relates to improvements in clutches for automobile transmission mechanism wherein a positive clutch is combined with a frictional clutch.

The primary object of this invention is to combine a positive clutch with a frictional clutch in such manner that when the frictional power of the frictional clutch is exceeded the positive clutch comes into action and locks the engine positively with the transmission mechanism.

In carrying out this improvement the arrangement is such that when releasing the clutch the positive member is released in advance of the release of the frictional member, and, vice versa, when the clutch is brought into operation the frictional portion first comes into action and the positive member may or may not be permitted to act by the operator, according to the requirements imposed upon the clutch.

There are other features of the invention having specific objects in view, all of which will be described and pointed out hereinafter.

In the accompanying drawings, Figure 1 is a sectional view taken longitudinally of the driving-shaft. Fig. 2 is a cross-sectional view of Fig. 1, taken on the dotted line 2 2 and looking in the direction indicated by arrow. Fig. 3 is a similar view taken on the dotted line 3 3 looking in the direction indicated by arrow. Fig. 4 is a detached perspective view of the parts 15, 17, and 18. Fig. 5 is a detail view of the engaging surfaces of the positive clutch.

Referring now to the drawings, 1 indicates the fly-wheel of an explosive-engine, which is connected to the engine crank-shaft or driving-shaft 2, and 3 is the main transmission or driven shaft. One end 4 of this shaft 3 is loosely journaled in what may be termed a "master" friction-disk member 5. This member 5 has its end 5' suitably positively locked to or connected with the engine crank-shaft 2, so that it revolves therewith.

The opposite end of the member 5 is formed into an annular laterally-extending disk $5^2$. Passing transversely through this friction-disk $5^2$, near its edge, are a suitable number of bolts 6, and the opposite ends of these bolts pass through a ring 7. Surrounding the bolts are the steel tubes 8, which have their ends abutting against the inner faces of the disk and ring, and by means of these bolts the ring 7 and disks are firmly connected.

Inclosed within the ring 7 is a movable friction clamping member 9, which is in the form of an annular or approximately cup-shaped housing having a peripheral flange 10, through which the steel tubes 8 loosely pass, so that it may move therein and also move freely through the ring. The opposite portion 11 of the member 9 extends inwardly toward the shaft 3 and surrounds the movable member 12 of a positive clutch. This movable member 12 is loose upon the shaft 3, so that it may move longitudinally thereon and so that the shaft 3 may revolve freely therein, and it has a slidable key connection 14 with the member 9.

A bushing 15 is firmly connected to the transmission-shaft 3. The engaging ends or faces of the bushing 15 and member 12 are provided with coacting interlocking milled clutch-jaws 16, whereby when they are in engagement they form a positive clutch between the engine crank-shaft and the transmission-shaft in a manner to be presently explained.

Located between the friction-disk $5^2$ and the movable clamping member 9 are a plurality of friction-disks 17 and 18. The alternate disks are respectively connected with the bolts 6 and the bushing 15, carried by the shaft 3. As here shown, the disks 17 are connected with the bolts 6 and revolve free of the bushing and shaft 3, while the disks 18 are connected with the bushing 15 and revolve with the shaft 3, but free of the bolts. The disks 17 are connected with the bolts by having the bolts pass through them, and the disks 18 are slidably keyed to the bushing, preferably by providing the bushing with four longitudinal slots and the disks with four projections sliding in said slots.

From the foregoing it will be understood that when these alternate disks 17 and 18 are pressed together the members 5, which carry the bolts, will frictionally drive the transmission-shaft 3 to tne extent of the frictional power. These disks are normally forced together in the position shown in Fig. 1 by means of a plurality of springs 19, (preferably six in number,) placed at intervals between the ring 7 and the movable clamping member 9. The ring 7 is connected with the member 5, so that the springs force the movable clamping member 9 in a direction to cause the friction-disks 17 and 18 to engage. Since the ring is part of the member 5 and the ring and member 5 receive the full thrust of the springs, all frictional thrust upon the parts being driven is avoided.

As shown, the springs 19 are placed in pockets 20, carried by the movable member 10, and adjustable members or screws 21 engage the projecting ends of the springs, by means of which the tension of the springs can be regulated as required to increase or decrease the frictional engagement of the disks 17 and 18.

The main transmission-shaft extends into a transmission-case 22, partly shown in outline, and is connected up in any suitable manner with any desired form of transmission-gearing, though the clutch is more particularly intended to be used in connection with a form of sliding gear transmission not here shown. The clutch is controlled by the lever 25, which is connected in any suitable manner to a manually-operated lever. (Not shown, as it forms no part of the present invention and is not essential to a full understanding of the present improvement.)

When the lever 25 is moved to the right in Fig. 1, it first moves the positive clutch out of action by compressing the spring 27, which is weaker than the combined tension of the springs 19. The further movement compresses the springs 19 and releases the friction-clutch. When the lever 25 is gradually released as intended, the friction-clutch is first applied and gradually picks up the load, and the positive clutch does not come into action unless the load exceeds the friction driving power of the friction-clutch. From the foregoing it will be understood that there is no shock to the driving mechanism in applying the clutches, while at the same time the positive clutch provides for a positive drive when the driving power of the friction-clutch is exceeded.

By the construction and arrangement herein disclosed we not only combine a positive clutch with a friction-clutch, but have a construction in which the clutch friction-springs do not cause any thrust on any bearing of the mechanism.

Having thus described my invention, what I claim, and desire to secure by Letters Patent, is—

1. In a transmission mechanism, the combination with a spring-operated friction-clutch, of a power-spring-actuated positive clutch, the spring for the positive clutch being weaker than the spring for the friction-clutch, and operating means connected with the positive clutch, whereby the spring of the friction-clutch is released in advance of releasing the spring for the positive clutch for the purpose described.

2. A clutch mechanism, comprising a driving-shaft, a driven shaft concentric therewith, a clutch member positively connected with the driving-shaft, a coacting clutch member movable in a direction longitudinal said shafts, and power devices connected with the first-mentioned clutch member and acting upon the coacting clutch member to move it into clutching action.

3. A clutch mechanism, comprising a driving-shaft, a concentrically-arranged driven shaft, a clutch member positively connected with the driving-shaft, a coacting clutch member, one of said clutch members being movable longitudinal said shafts, and power devices acting against said clutch members to force them toward each other.

4. A clutch mechanism, comprising a driving-shaft, a concentrically-arranged driven shaft, a disk-shaped clutch member connected with the driving-shaft, a concentrically-arranged coacting clutch member movable longitudinal said shafts, the first-mentioned clutch member having portions projecting beyond the coacting clutch member, and expanding-springs located between the coacting clutch member and the projecting portions of the first-mentioned clutch member for the purpose described.

5. A clutch mechanism, comprising a driving-shaft, a concentrically-arranged driven shaft, a clutch member 5 carried by the driving-shaft, a coacting clutch member movable longitudinal the driven shaft, alternate friction-disks between said clutch members and alternately connected with the first-mentioned clutch member, and with the driven shaft, springs acting against said clutch members to force them toward each other and clamp said friction-disks together, a positive clutch on said driven shaft located between said disks and the coacting clutch member, and an expansion-spring acting between the positive clutch and the said coacting clutch member of less tension than the tension of the first-mentioned springs, and operating means connected with the positive clutch the parts operating substantially as described.

6. In a transmission mechanism, the combination with a spring-actuated friction-clutch, a positive clutch adapted to move the friction-clutch against its actuating-spring, and a spring between the two clutches serving to force the positive clutch into action, and means for moving the positive clutch.

7. In a clutch, the combination of a clutch member having the separated but connected parts 5 and 7, a movable coöperating clutch member located at a point between said parts, and a spring engaging one of said parts and the said movable clutch member to prevent thrust friction in the application of the clutch.

8. In a clutch, the combination of a clutch member, having separated but connected parts 5 and 7, a movable coöperating clutch member between said parts, and springs between the parts 7 and the movable clutch member serving to force the latter member into clutching action.

9. In a clutch, the combination of a clutch member having a peripheral member $5^2$, a member 7 separated therefrom, bolts connecting the said members, a movable coöperating clutch member located between the members $5^2$ and 7, the bolts and movable clutch member carrying alternately-arranged friction-disks, and springs between the clutching member serving to force the movable member to position for moving the disks into engagement.

10. In a transmission mechanism, the combination of a friction-clutch having friction members one being movable in respect to the other, springs between said members forcing them toward each other, a positive clutch having a movable member, a spring between the movable members of the friction and positive clutch members, said spring being weaker than the spring of the friction-clutch, and means for moving the movable member of the positive clutch, the parts operating as and for the purpose described.

11. In a transmission mechanism, the combination of a friction-clutch provided with a clutch member 52, a coöperating movable clutch member 10, springs between said members and serving to force them toward each other, a positive clutch having a movable member $12'$, the member 10 having a portion extending inward to embrace the member $12'$, an expanding-spring between the member $12'$ and inwardly-extending portion of the member 10, said spring being weaker than the spring of the friction-clutch, and means for operating the clutch member $12'$, the parts cooperating as and for the purpose described.

In testimony whereof we affix our signatures in presence of two witnesses.

ALEXANDER WINTON.
HAROLD B. ANDERSON.

Witnesses:
O. F. BAUGHMAN,
C. PAUL TRACY.